(12) United States Patent
Young, Jr.

(10) Patent No.: US 6,523,983 B2
(45) Date of Patent: Feb. 25, 2003

(54) AUTOMOTIVE LAMP CLOSEOUT AND METHOD OF CONSTRUCTING SAME

(75) Inventor: Paul E. Young, Jr., Muncie, IN (US)

(73) Assignee: Guide Corporation, Pendleton, IN (US)

( * ) Notice: Subject to any disclaimer, the term of this patent is extended or adjusted under 35 U.S.C. 154(b) by 0 days.

(21) Appl. No.: 09/931,130

(22) Filed: Aug. 16, 2001

(65) Prior Publication Data

US 2002/0024820 A1 Feb. 28, 2002

Related U.S. Application Data

(60) Provisional application No. 60/226,127, filed on Aug. 18, 2000.

(51) Int. Cl.[7] .............................................. F21V 17/10
(52) U.S. Cl. ........................ 362/546; 362/267; 362/375; 362/520
(58) Field of Search ................................ 362/267, 326, 362/362, 374, 375, 496, 546, 520

(56) References Cited

U.S. PATENT DOCUMENTS

| | | | |
|---|---|---|---|
| 4,036,522 A | 7/1977 | DeRees et al. | 296/154 |
| 4,165,119 A | 8/1979 | Hedeen et al. | 296/93 |
| 4,206,927 A | 6/1980 | Garascia | 277/12 |
| 4,318,161 A | 3/1982 | Shanks | 362/226 |
| 4,358,917 A | 11/1982 | Oda et al. | 52/717 |
| 4,571,278 A | 2/1986 | Kunert | 156/108 |
| 4,581,276 A | 4/1986 | Kunert et al. | 428/157 |
| 4,760,506 A | 7/1988 | Mochizuki et al. | 362/226 |
| 4,938,831 A | 7/1990 | Wolf, Jr. | 156/275.3 |
| 4,950,019 A | 8/1990 | Gross | 296/93 |
| 5,069,012 A | 12/1991 | Riederer | 52/208 |
| 5,088,787 A | 2/1992 | Gross | 296/93 |
| 5,113,320 A | 5/1992 | Haydu | 362/61 |
| 5,137,323 A | 8/1992 | Gross et al. | 296/93 |
| 5,188,444 A | 2/1993 | Makita et al. | 362/80 |
| 5,327,330 A | 7/1994 | Van Oel et al. | 362/61 |
| 5,331,521 A | 7/1994 | Ravier et al. | 362/80 |
| 5,336,349 A | 8/1994 | Cornils et al. | 156/107 |
| 5,343,370 A | 8/1994 | Ohashi et al. | 362/61 |
| 5,507,994 A | 4/1996 | Cornils et al. | 264/252 |
| 5,508,894 A | 4/1996 | Payne et al. | 362/61 |
| 5,603,546 A | 2/1997 | Desir, Sr. | 296/93 |
| 5,611,180 A | 3/1997 | Agrawal et al. | 52/393 |
| 5,620,648 A | 4/1997 | Volkmann et al. | 264/511 |
| 5,855,430 A | 1/1999 | Coushaine et al. | 362/519 |
| 5,864,996 A | 2/1999 | Veldman et al. | 52/240.597 |
| 5,893,632 A | 4/1999 | Kusagaya et al. | 362/226 |
| 5,906,697 A | 5/1999 | Hasegawa et al. | 156/108 |
| 5,915,831 A | 6/1999 | Bonin et al. | 362/519 |
| 5,993,036 A | 11/1999 | Shimada et al. | 362/549 |
| 6,000,814 A | 12/1999 | Nestell et al. | 362/267 |
| D419,022 S | 1/2000 | Cadorette | D6/580 |
| 6,017,136 A | 1/2000 | Burton | 362/273 |
| 6,042,251 A | 3/2000 | McCarthy et al. | 362/308 |
| 6,054,001 A | 4/2000 | Swanson et al. | 156/108 |
| 6,080,019 A | 6/2000 | Coushaine | 439/611 |
| 6,190,026 B1 * | 2/2001 | Moore | 362/496 |
| 6,250,776 B1 * | 6/2001 | Burkitt et al. | 362/267 |

* cited by examiner

*Primary Examiner*—Alan Cariaso
(74) *Attorney, Agent, or Firm*—Russell E. Fowler, II; Jay G. Taylor; Ice Miller

(57) ABSTRACT

A vehicle lamp assembly comprises a lamp housing, a lens, and a closeout sub-assembly. The closeout sub-assembly comprises a closeout and a template attached to the closeout. The closeout sub-assembly is created by forming the closeout around the outer periphery of the template such that the outer portion of the closeout is located adjacent to and outside of the peripheral edge of the template. The vehicle lamp assembly is created by affixing the closeout sub-assembly to the outer periphery of the inner surface of the lens and attaching the lens to the housing such that the closeout sub-assembly is located between the lens and the housing and such that the outer portion of the closeout is located adjacent to and outside of the peripheral edge of the lens.

16 Claims, 4 Drawing Sheets

AUTOMOTIVE LAMP CLOSEOUT AND METHOD OF CONSTRUCTING SAME

CROSS REFERENCE TO RELATED APPLICATIONS

This application claims the benefit of U.S. Provisional Application No. 60/226,127 filed Aug. 18, 2000.

FIELD OF THE INVENTION

The present invention relates generally to automotive lamps. More specifically, the present invention relates to the construction and methods of manufacture of automotive lamp closeouts for automotive lamps, and particularly tail lamps.

BACKGROUND

Aerodynamics and appearance have become an increasingly important aspect of automotive design. Car buyers tend to perceive aerodynamic vehicles as modern and "high tech," characteristics desirable to many car-buying demographics. Additionally, aerodynamic vehicles produce less drag, which makes them easier to push through air. As a result, they generally require less energy to propel and consume less fuel than similarly situated less aerodynamic vehicles. Also, the turbulence caused by drag often results in undesirable wind noise, especially surrounding obstructions that interfere with smooth air flow such as bumpers, side mirrors, and gaps between body panels. Gaps, especially on the leading edge of a vehicle, create drag, which lowers the vehicle's aerodynamic performance. Further, wider gaps tend to be less aesthetically pleasing to many consumers as they are associated with lower quality workmanship. One critical location where gaps are present is between a vehicle's body panels and components, such as a vehicle's headlamps or tail lamps. Thus, minimizing such gaps is desirable.

A typical automotive lamp is an assembly of three primary components, an opaque housing portion (usually recessed into the body of a vehicle) having an open end and an opposite end configured to retain a light bulb, a light transmissive and diffusing lens portion affixed to the open front of the housing, and at least one light bulb. Generally, the front profile of such lighting assemblies is substantially rectangular or elliptical, although the profile is not limited to these shapes.

Exterior lamps of the type described above are usually retained in recesses in the surface of a vehicle. In an effort to minimize drag, and thus maximize aerodynamic performance, vehicle lamps are usually flush mounted to minimize their effect on the flow of air around a vehicle. For example, headlamps are generally flush mounted in a space next to the grill between the vehicle's bumper and hood. Similarly, tail lights are usually flush mounted between a vehicle's rear bumper and either the trunk hatch or rear fender. However, while flush mounted, lamps do not fit into their recesses exactly. Instead, there is a gap that allows for adjustment and compensates for minor variations in vehicle manufacture.

To minimize this gap, vehicle manufacturers use closeouts affixed to the periphery of the lamp to fill the void between the lamp body and the vehicle. In addition to improving its aerodynamic performance, they ensure an aesthetically pleasing finished look to a vehicle.

The typical closeout is, for economy and ease of manufacture, an extruded element formed in one of the many extrusion processes known in the art. Because it is extruded, a typical closeout has a side profile of the die through which it is extruded and is generally a long and substantially straight workpiece. As a result, to position and affix the closeout to the periphery of the lens, an operator must perform a shaping operation on the closeout. The closeout may then be affixed by any number of means including, but not limited to: adhesives; mechanical clips; and sonic or heat welds.

Unfortunately, this process has several disadvantages. First, the configuration operation takes time to perform in addition to that which must be spent assembling the assembly. Also, manual configuration of the closeout and application to the three-dimensional surface of the lens results in an inconsistent thickness of the closeout around the periphery of the lens that produces an undesirable appearance and sub-optimal performance. Additionally, this manual step results in additional wasted material that must be scrapped because of mishandling by the operator.

Therefore, it is desired to provide a closeout that effectively fills the void between the lamp and the vehicle resulting in an aesthetically pleasing appearance and desired aerodynamic performance. It is further desired that such a construction provide an assembly with desired consistent quality. Still further, it is desired that such construction be easy to install, thus decreasing the amount of manual operation on each workpiece. Finally, it is also desired that such an assembly not be overly complex or expensive to manufacture.

SUMMARY OF THE INVENTION

The present invention provides a process of constructing a vehicle lamp closeout whereby a closeout with the shape matching the profile of the lens to which it is to be attached is provided, thus obviating the need to shape the closeout prior to affixing it to the lens. The process incorporates the use of a template to preform the extruded closeout to match the front profile of the lens. The pre-shaped closeout with the template attached thereto may then more easily and consistently be affixed to the front of the lamp near the lens. The process is then further effectuated by joining the closeout and lamp in the various ways known in the art.

The apparatus for effectuating the foregoing method of the present invention can comprise a closeout pre-shaped by a template to match the profile of the lamp as dictated by the lens. It is contemplated that the pre-shaping may be achieved through both manual and mechanical operation. It is further contemplated that the construction of a vehicle lamp assembly containing the closeout sub-assembly of the present invention may be achieved through both manual and mechanical operation. Further, the gap between the lamp and the vehicle body can be effectively and efficiently minimized at the lamp-body interface. These and other features, aspects, and advantages of the present invention will become better understood with reference to the following description and claims.

DESCRIPTION

Figure 1:
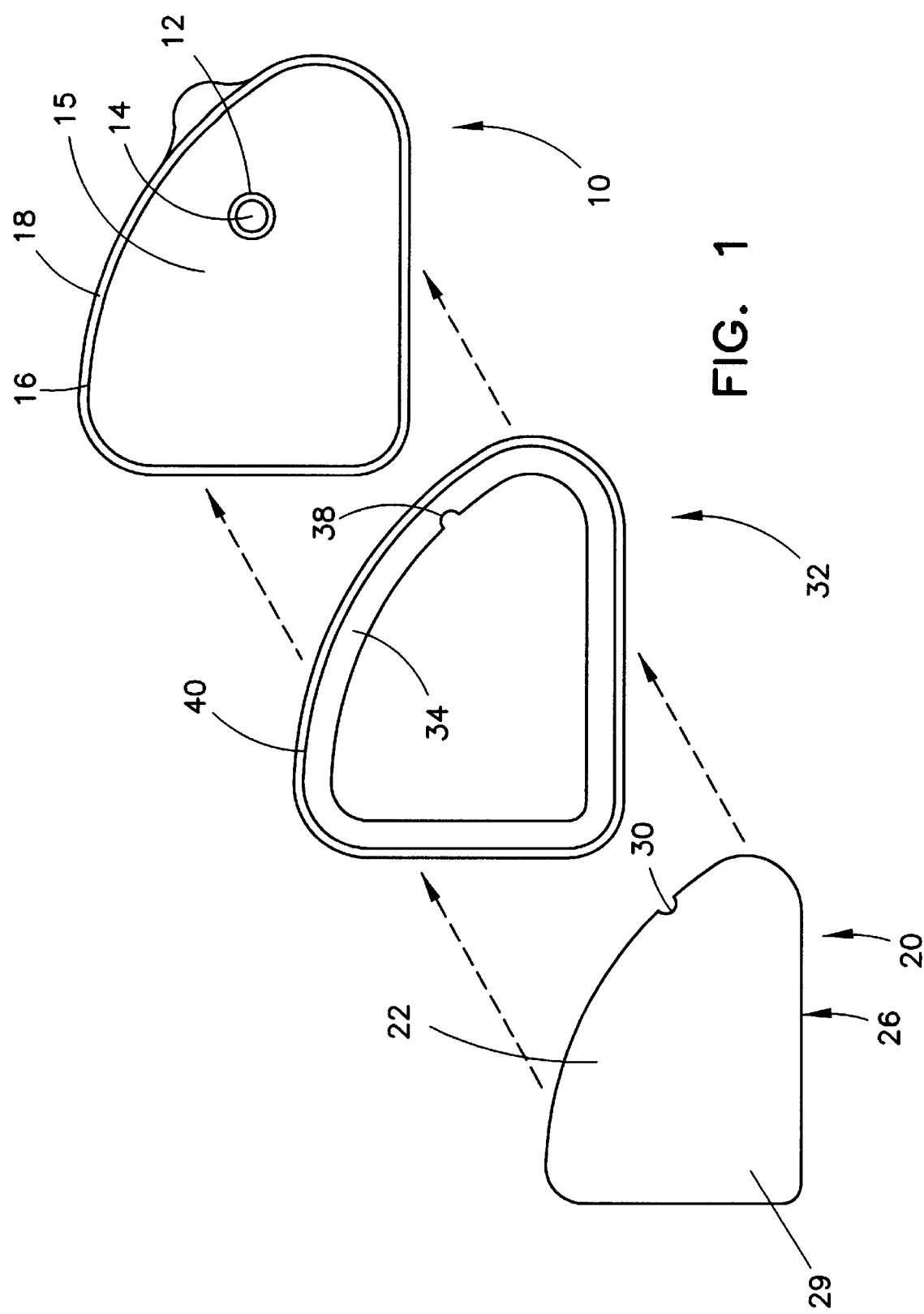
FIG. 1 is an exploded view of a typical lamp assembly.

Referring to FIG. 1, there is shown an exploded typical lamp assembly. The assembly contains a housing 10, with a bulb aperture 12 to allow for the insertion and retention of bulb 14. The inner surface 15 of housing 10 is parabolic and silvered to direct light emitted from the bulb 14 forward. The edge of the housing 16 has, at its periphery, a channel 18 to accept rib 22 along the edge of lens 20. The front profile of the housing 10 may be of any shape.

Lens 20 has an inner concave surface 24 and an outer surface 26. (See FIG. 4). Rib 22 is integrally formed at the periphery of the inner surface 24 of lens 20 and configured to mate with the housing channel 18. The lens 20 has the same front profile as the housing 10 and is provided with guide tab 30 (see FIG. 1) to guide closeout sub-assembly 32 during construction.

Figure 2:
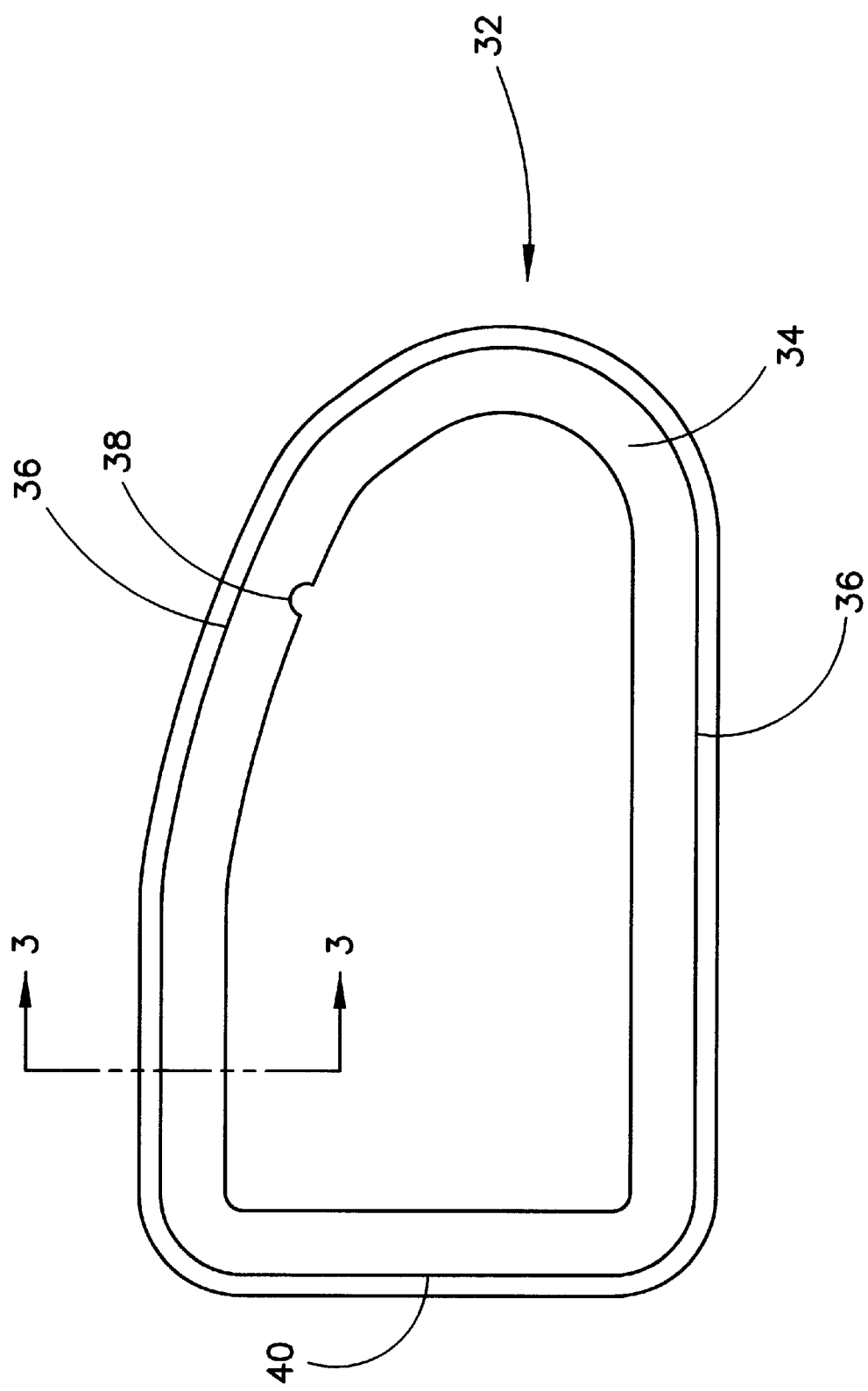
FIG. 2 is a front view of a closeout sub-assembly.

Referring to FIG. 2, there is shown closeout sub-assembly 32, which consists of template 34, and extruded closeout 36, shown after having been pre-shaped with the template 34 so as to have a front profile matching those of the lens 20 and housing 10. The sub-assembly 32 is provided with locator notch 38 to align it with the lens guide tab 30 during assembly.

The template 34 may be constructed of a sufficiently durable economical material such as polycarbonate or acrylonitrile butadiene styrene (ABS).

Figure 3:
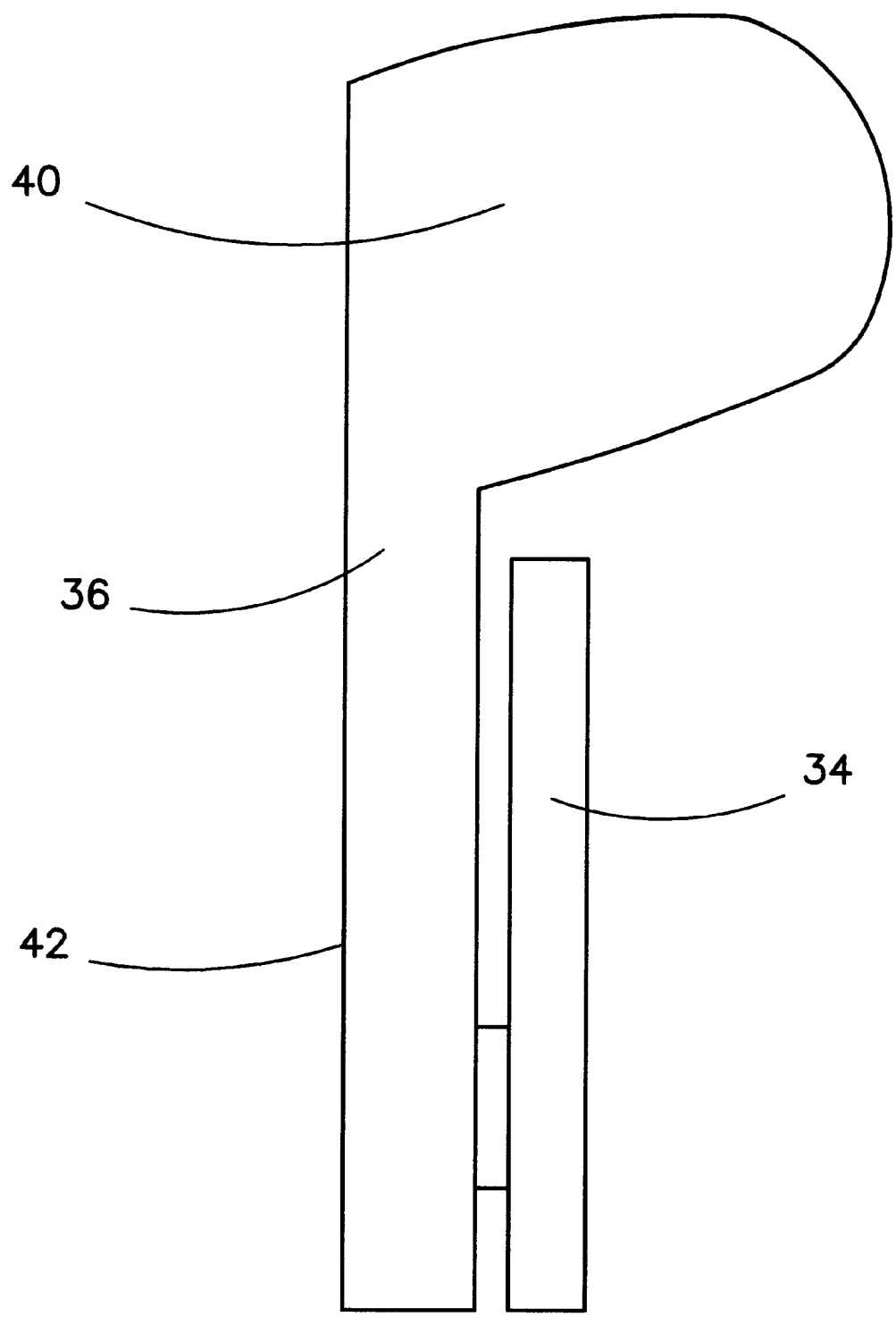
FIG. 3 is a side profile of the closeout sub-assembly of FIG. 2 taken substantially along line 3—3 in FIG. 2.

Referring to FIG. 3, there is shown a side view, substantially along line 3—3 of FIG. 2, of the closeout sub-assembly 32 of the present invention. The closeout 36 consists of an outer portion 40 and a flat inner portion 42 to which template 34 is joined with the closeout 36 by any means known in the art. One manner of joining the template 34 with the closeout 36 is by pressing the template 34 to the inner portion of the closeout 36 using a commercial press. Affixing the closeout 36 to the two-dimensional surface of the template 34 is faster than attaching the closeout 36 to the three-dimensional periphery of the lens 20. Additionally, affixing the closeout 36 to the template 24 results in a more even, consistent closeout surface around the peripheral edge of the template 24 than can be accomplished by forming the closeout 36 around the edge of the lens 20.

The closeout sub-assembly 32 is then attached to the periphery of the inner surface of the lens 20. One manner of effectuating this attachment is by placing adhesive on the side of the template 34 opposite to that attached to the closeout 36 and bringing the periphery of the inner surface 24 of the lens 20 into contact with the adhesive. Other means known in the art of attaching the sub-assembly 32 to the lens 20 may be used, including, but not limited to, star washer clips or other fasteners.

Figure 4:
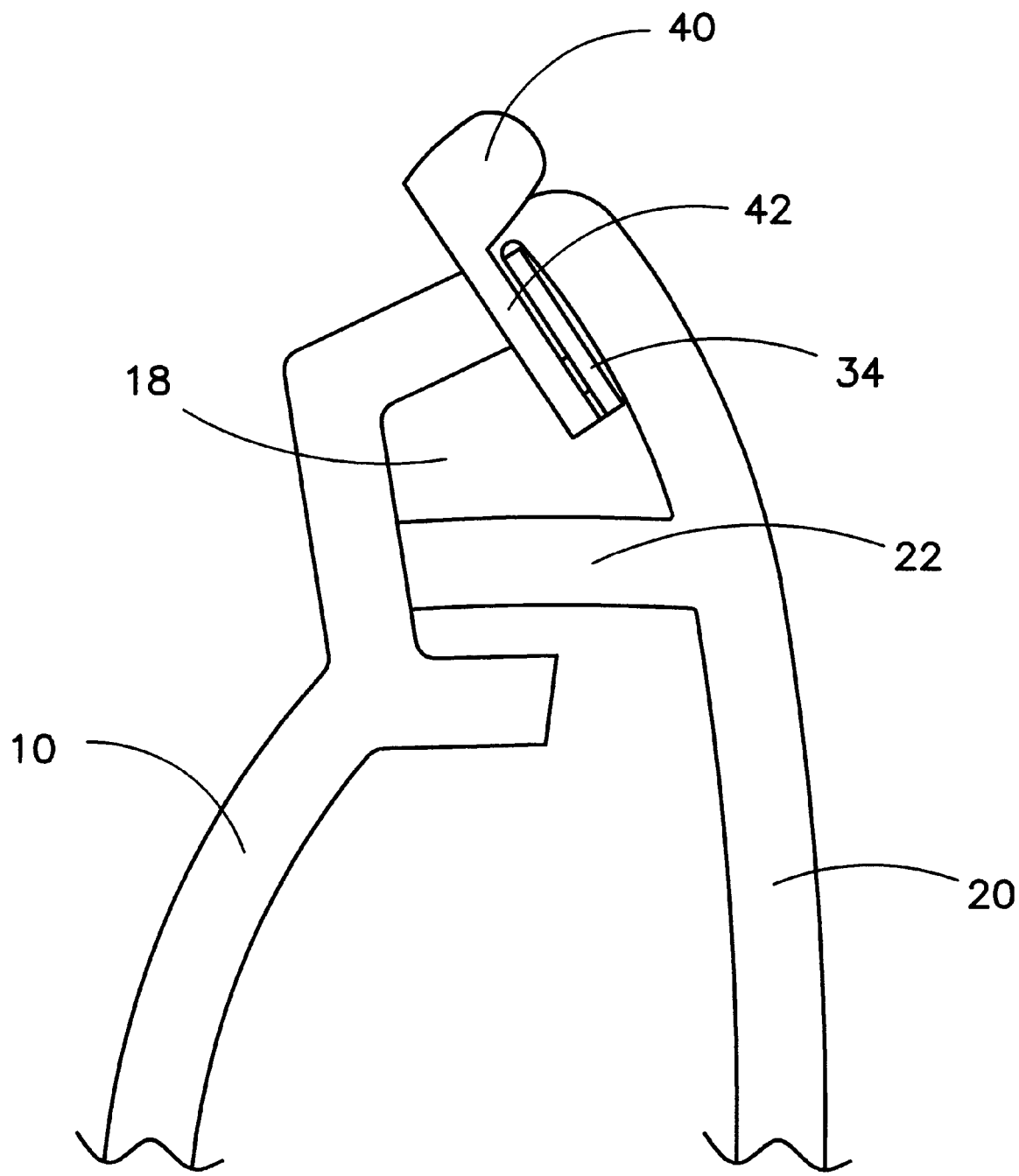
FIG. 4 is a partially sectioned side view of a lamp assembly according to the invention.

FIG. 4 shows a partial sectional view of the assembled lamp of the present invention wherein the lens 20 and housing 10 are engaged via channel 18 and rib 22. The engagement between the lens 20 and the housing 10 may be accomplished by any means known in the art, including, but not limited to, adhesives, clips or other fasteners. One manner of affixing the lens 20 and the housing 10 comprises placing an adhesive, such as hot melt adhesive or two-part epoxy, in the channel 18 of the housing 10 and bringing the rib 22 of the lens 20 into contact with the adhesive in the channel 18. To maintain the connection between the lens 20 and the housing 10 during the adhesive curing process, additional means of attaching the lens 20 to the housing 10 may be used, such as sonic tacking the lens 20 to the housing 10 in one or more locations. When the lens 20 is affixed to the housing 10, closeout sub-assembly 36 is attached to the inner surface 24 of the lens 20 and is trapped between the lens 20 and the housing 10. However, the sub-assembly 32 may alternatively be affixed to the housing 10 and subsequently trapped after the lens 20 and housing 10 are joined. In this position, the closeout sub-assembly 32 fills the gap between the lamp assembly and the body of the vehicle when installed.

While the present invention has been described with respect to a particular application and exemplary embodiment, such is offered by way of non-limiting example of the invention. It is anticipated that a variety of modifications and changes will be apparent to those having ordinary skill in the art and that such modifications and changes are intended to be encompassed within the scope of the invention as defined by any later appended claims. Therefore, the spirit and scope of the appended claims should not be limited to the description of the preferred versions contained herein.

What is claimed is:

1. A vehicle lamp assembly comprising:
    a lamp housing, having an inner reflective surface and an outer peripheral edge formed in a predetermined shape;
    a lens, having an inner surface and an outer surface and a peripheral edge formed and dimensioned to coincide with the predetermined shape of said lamp housing;
    a closeout sub-assembly, comprising a closeout and a template, the closeout having an outer portion and an inner portion, the closeout inner portion having a first side and a second side, the template having a first side and a second side, with the template's first side attached to the closeout inner portion's first side; and,
    the closeout sub-assembly attached to the outer periphery of the inner surface of the lens and the outer periphery of the inner surface of the housing, such that the closeout sub-assembly is located between the lens and the housing and such that the outer portion of the closeout is located adjacent to and outside of the peripheral edge of the lens.

2. The vehicle lamp assembly of claim 1 wherein the closeout is an extruded element.

3. The vehicle lamp assembly of claim 1 wherein the template consists substantially of acrylonitrile butadiene styrene.

4. The vehicle lamp assembly of claim 1 wherein the template consists substantially of polycarbonate.

5. The vehicle lamp assembly of claim 1 wherein a locator tab protrudes from the inner surface of the lens and the second side of the template contains a locator notch such that the locator tab engages the locator notch when the lens and template are joined.

6. The vehicle lamp assembly of claim 1 wherein the template has a front profile and the front profile is formed and dimensioned to coincide with the peripheral edge of the lens.

7. A method of constructing a closeout sub-assembly for a vehicle lamp assembly comprising:
    providing a closeout having an outer portion and an inner portion, the inner portion having a first side and a second side;
    providing a template having a first side and a second side and a peripheral edge formed in a predetermined shape;
    placing the first side of the inner portion of the closeout against the first side of the template; and
    utilizing a commercial press to form the closeout around the outer periphery of the first side of the template such that substantially all of the first side of the template contacts the first side of the inner portion of the closeout and such that the outer portion of the closeout is located adjacent to and outside the peripheral edge of the template.

8. The method of constructing a vehicle lamp assembly comprising:
   providing a lamp housing having an inner reflective surface and an outer peripheral edge formed in a predetermined shape;
   providing a lens having an inner surface and an outer surface and a peripheral edge formed and dimensioned to coincide with the predetermined shape of said lamp housing;
   providing a closeout sub-assembly, comprising a closeout and a template, the closeout having an outer portion and an inner portion, the closeout inner portion having a first side and a second side, the template having a first side and a second side, with the template's first side attached to the closeout inner portion's first side;
   attaching the second side of the closeout sub-assembly template to the outer periphery of the inner surface of the lens; and,
   attaching the lens to the housing such that the closeout sub-assembly is located between the lens and the housing and such that the outer portion of the closeout is located adjacent to and outside of the peripheral edge of the lens.

9. The method of constructing a vehicle lamp assembly of claim 8 wherein attaching the lens to the housing comprises joining a rib at the outer periphery of the inner surface of the lens to a channel at the outer periphery of the inner surface of the housing.

10. The method of constructing a vehicle lamp assembly of claim 8 wherein attaching the lens to the housing is accomplished through the use of one or more adhesives.

11. The method of constructing a vehicle lamp assembly of claim 8 wherein attaching the second side of the closeout sub-assembly template to the outer periphery of the inner surface of the lens is accomplished through the use of one or more adhesives.

12. The method of constructing a vehicle lamp assembly of claim 8 wherein attaching the second side of the closeout sub-assembly template to the outer periphery of the inner surface of the lens includes aligning a locator notch on the second side of the template with a locator tab on the inner surface of the lens.

13. The method of constructing a vehicle lamp assembly of claim 8 wherein the method is performed manually.

14. The method of constructing a vehicle lamp assembly of claim 8 wherein the method is performed by a machine.

15. The method of constructing a vehicle lamp assembly of claim 8 further comprising affixing the second side of the closeout to the outer periphery of the inner surface of the housing.

16. The method of constructing a vehicle lamp assembly of claim 15 wherein affixing the second side of the closeout to the outer periphery of the inner surface of the housing is accomplished by one or more affixing agents selected from the group consisting of an adhesive, a mechanical clip, a sonic weld, and a heat weld.

* * * * *